(12) United States Patent
Sakane

(10) Patent No.: US 7,546,407 B2
(45) Date of Patent: Jun. 9, 2009

(54) FLEXIBLE WIRING SYSTEM FOR ELECTRONIC APPARATUS

(75) Inventor: Hiroyuki Sakane, Anjo (JP)

(73) Assignee: DENSO Corporation, Kariya (JP)

( * ) Notice: Subject to any disclaimer, the term of this patent is extended or adjusted under 35 U.S.C. 154(b) by 268 days.

(21) Appl. No.: 11/511,372

(22) Filed: Aug. 29, 2006

(65) Prior Publication Data

US 2007/0049086 A1 Mar. 1, 2007

(30) Foreign Application Priority Data

Aug. 30, 2005 (JP) ............................. 2005-248947

(51) Int. Cl.
*G06F 13/00* (2006.01)
*H01R 12/00* (2006.01)
*B60L 1/00* (2006.01)
(52) U.S. Cl. .................... 710/300; 439/259; 439/76.2; 307/9.1; 307/10.1; 307/10.2; 307/10.8
(58) Field of Classification Search ................. 439/259
See application file for complete search history.

(56) References Cited

U.S. PATENT DOCUMENTS

| | | | |
|---|---|---|---|
| 3,832,009 A * | 8/1974 | Leiber et al. ................. 303/168 |
| 4,579,407 A | 4/1986 | Shimada | |
| 5,502,615 A * | 3/1996 | Kubota et al. ............... 361/647 |
| 5,768,092 A * | 6/1998 | Nishitani ..................... 361/627 |
| 5,808,371 A | 9/1998 | Kon'i et al. | |
| 5,859,845 A | 1/1999 | Oniishi et al. | |
| 5,917,249 A | 6/1999 | Kon'i et al. | |
| 6,020,811 A | 2/2000 | Saito et al. | |
| 6,087,777 A | 7/2000 | Long | |
| 6,107,696 A | 8/2000 | Peter et al. | |
| 6,166,453 A | 12/2000 | Kon'i et al. | |
| 6,166,460 A * | 12/2000 | Chutorash ................... 307/139 |
| 6,182,807 B1 | 2/2001 | Saito et al. | |
| 6,236,918 B1 | 5/2001 | Sonoda et al. | |
| 6,243,018 B1 | 6/2001 | Saito et al. | |

(Continued)

FOREIGN PATENT DOCUMENTS

DE 39 13 266 A1 10/1990

(Continued)

OTHER PUBLICATIONS

U.S. Appl. No. 11/511,350, filed Aug. 29, 2006.

(Continued)

*Primary Examiner*—Paul R Myers
*Assistant Examiner*—Brian T Misiura
(74) *Attorney, Agent, or Firm*—Nixon & Vanderhye, P.C.

(57) ABSTRACT

A flexible wiring system for an electronic system includes an intermediate distributing unit and a changeover control unit. The intermediate distributing unit includes first side connectors connectable with an input side and an output side of a basic control circuit, second side connectors connectable with inputting devices such as various sensors and outputting devices such as various actuators and a changeover mechanism disposed between a set of the first side connectors and a set of the second side connectors. The changeover control unit controls the changeover mechanism to change connection of the set of first side connectors with the set of second side connectors according to a specific device to be connected with the set of second side connectors.

7 Claims, 16 Drawing Sheets

U.S. PATENT DOCUMENTS

| | | | |
|---|---|---|---|
| 6,249,425 B1 * | 6/2001 | Sudo et al. | 361/627 |
| 6,356,826 B1 | 3/2002 | Pohjola | |
| 6,401,891 B1 | 6/2002 | Saito et al. | |
| 6,408,998 B1 | 6/2002 | Saito et al. | |
| 6,420,799 B1 | 7/2002 | Sakamoto et al. | |
| 6,469,404 B1 | 10/2002 | Pohjola | |
| 6,472,770 B1 | 10/2002 | Pohjola | |
| 6,479,973 B2 | 11/2002 | Saito et al. | |
| 6,511,342 B1 * | 1/2003 | Hein et al. | 439/502 |
| 6,743,027 B1 * | 6/2004 | Kowtun | 439/76.2 |
| 6,769,521 B2 | 8/2004 | Saito et al. | |
| 6,900,555 B2 | 5/2005 | Sakamoto et al. | |
| 7,132,761 B2 * | 11/2006 | Rhodes | 307/10.1 |
| 7,213,097 B2 * | 5/2007 | Kasame et al. | 710/317 |
| 2002/0043964 A1 | 4/2002 | Saito et al. | |
| 2003/0090153 A1 | 5/2003 | Rhodes | |
| 2003/0098211 A1 | 5/2003 | Saito et al. | |
| 2005/0168072 A1 | 8/2005 | Saito et al. | |
| 2005/0197753 A1 * | 9/2005 | Miura et al. | 701/45 |
| 2006/0238938 A1 * | 10/2006 | Shaya et al. | 361/78 |
| 2007/0273492 A1 * | 11/2007 | Hara et al. | 340/438 |

FOREIGN PATENT DOCUMENTS

| | | |
|---|---|---|
| DE | 40 27 626 A1 | 3/1992 |
| DE | 103 16 694 A1 | 10/2004 |
| DE | 103 52 036 A1 | 6/2005 |
| GB | 2 248 942 A | 4/1992 |
| JP | 2000-253514 | 9/2000 |
| JP | 2004-306848 | 11/2004 |
| WO | 2004-089697 A1 | 10/2004 |

OTHER PUBLICATIONS

Office Action issued Jul. 29, 2008 in corresponding German Application No. 10 2006 040 406.8-34 and an at least Partial English-language translation thereof.

* cited by examiner

| DEVICE (N) | ST/OP | OCCUPATION TIME RATIO |
|---|---|---|
| 1 | ST | $\alpha_1$ |
| 2 | OP | $\alpha_2$ |
| 3 | ST | $\alpha_3$ |
| ⋮ | ⋮ | ⋮ |

200

| ECU (n) | COUNTER |
|---|---|
| 1 | $C_1$ |
| 2 | $C_2$ |
| 2 | $C_3$ |

201

FLEXIBLE WIRING SYSTEM FOR ELECTRONIC APPARATUS

CROSS REFERENCE TO RELATED APPLICATION

The present application is based on and claims priority from Japanese Patent Application 2005-248947, filed Aug. 30, 2005, the contents of which are incorporated herein by reference.

BACKGROUND OF THE INVENTION

1. Field of the Invention

The present invention relates to a flexible wiring system for connecting an extra electronic device with an electronic system of a vehicle.

2. Description of the Related Art

Electronic devices that are mounted in a vehicle are increasing year by year. Various electronic devices are mounted in various portions or areas of a vehicle, such as the engine compartment, the passenger compartment, the instrument panel and/or the roof liner area. Such electronic devices are connected with one or a plurality of control circuits (ECU) by specific wire harnesses and intermediate distributing units or junction boxes, as disclosed in JP-A-2000-253514.

Usually, when an additional electronic device such as an auto light sensor is connected with an extra terminal of an ECU, the auto light sensor is not directly connected with the extra terminal. The signal wire of the auto light sensor is accommodated in an instrument panel wire harness to connect the auto light sensor with an intermediate distributing unit, which is connected with the extra connector of the ECU. In case of a rain sensor, the signal wire is accommodated in a roof harness to connect the rain sensor with the intermediate distributing unit, which is, then, connected with the extra terminal of the ECU. Therefore, it is necessary to have additional wires for not only connecting the additional device with the intermediate distributing unit but also connecting the intermediate distributing unit with the ECU.

In order to provide additional connectors in the intermediate connecting unit, it is also necessary to change a distributing board of the intermediate distributing unit, which causes additional cost and works.

P2001-523610A and its counterpart U.S. Pat. Nos. 6,472,770, 6,469,404 and 6,356,826 disclose an intelligent current distribution system that connects one of a plurality of wires accommodated in a wire harness and an outside switch board via pins that penetrate the insulation cover of the wire harness so as to switch on or off the connection between the wire and an additional device. However, it is difficult to connect one wire accommodated in one wire harness to an additional device that is connected with another wire accommodated in a different wire harness.

SUMMARY OF THE INVENTION

Therefore, an object of the invention is to provide an improved wiring system for connecting an extra electronic device with an electronic system of a vehicle at a low cost.

Another object of the invention is to provide a flexible wiring system that can make effective use of connecting wires accommodated in a wire harness and connectors in an intermediate distributing unit.

According to a feature of the invention, a flexible wiring system for an electronic system includes an intermediate distributing unit and a changeover control circuit. The intermediate distributing unit includes first side connectors connectable with a basic control circuit, second side connectors connectable with the inputting devices and the outputting devices and a changeover mechanism disposed between a first set of the first side connectors and a first set of the second side connectors. The changeover control circuit controls the changeover mechanism to change connection of the first set of first side connectors with the first set of second side connectors according to a device to be connected with one of the first set of the second side connectors.

Assuming that one of the first and second wire harness has an extra or unused wire and the other has no extra wire. An optional inputting device such as a sensor and/or an optional outputting device such as an actuator can be connected with a corresponding control circuit via the second wire harness by changing over connection of the first and second wire harnesses. Therefore, it is not necessary to add an additional wire to the second wire harness.

In the above flexible wiring system: the changeover control circuit is preferably disposed in the basic control circuit: in case of the first set of the first side connectors being connected with the input side of the basic control circuit and the first set of the second side connectors being connected with an inputting device, the changeover mechanism changes over connection of the first set of the first side connectors from one of the first set of the second side connectors to another; in case of the first set of the first side connectors being connected with an output side of the control circuit and the first set of the second side connectors being connected with an outputting device, the changeover mechanism changes over connection of the first set of the first side connectors from one of the first set of the second side connectors to another.

The above flexible wiring system may further includes a second set of the first side connectors connected with an output side of the basic control circuit and a second set of the second side connectors connected with an outputting device. In this case, the changeover mechanism changes over connection of the second set of the first side connectors from one of the second set of the second side connectors to another.

The above flexible wiring system further includes an outputting-device control circuit and a first changeover circuit disposed between the input side of the basic control circuit and the outputting-device control circuit. In this case, the changeover control circuit controls the changeover circuit to change connection of the outputting-device control circuit from one of the first set of connectors to another when controlling the changeover mechanism to change connection of the first set of the first side connectors and the second set of the second side connectors.

The above flexible wiring system further includes a second changeover circuit disposed between the output side of the basic control circuit and the outputting-device control circuit. The changeover control circuit controls the second changeover circuit to change connection of the outputting-device control circuit from one of the first side connectors to another when controlling the changeover mechanism to change connection of the first set of the first side connectors with the first set of the second side connectors.

According to another feature of the invention, a flexible wiring system includes an intermediate distributing unit and a changeover control circuit. The intermediate distributing unit includes first side connectors connectable with the basic control circuit and the optional control circuit, a plurality of second side connectors connectable with the inputting devices, the outputting devices and a changeover mechanism disposed between a first set of the first side connectors and a first set of the second side connectors. The changeover control circuit controls the changeover mechanism to change connection of the first set of first side connectors with the first set of second side connectors according to a device to be connected with the second set of the second side connectors.

In the above flexible wiring system, the inputting and outputting devices include devices of standard equipment and devices of optional equipment; the changeover mechanism includes a switch matrix for connecting devices of standard equipment and devices of optional equipment; and the changeover control means includes means for discriminating the devices of standard equipment and the devices of optional equipment, and means for connecting the devices of the standard equipment to an extra connector of the basic control circuit prior to the optional equipment. Instead, the changeover control means may include means for discriminating the devices of standard equipment and the devices of optional equipment, and means for allotting each discriminated device to an extra connector of one of the basic control circuit and the optional control system so that the devices of standard equipment can be connected with one of the basic control circuit and the optional control system prior to the devices of optional equipment.

BRIEF DESCRIPTION OF THE DRAWINGS

Other objects, features and characteristics of the present invention as well as the functions of related parts of the present invention will become clear from a study of the following detailed description, the appended claims and the drawings. In the drawings:

DETAILED DESCRIPTION OF THE PREFERRED EMBODIMENTS

The present invention will be described with reference to the appended drawings hereafter.

A flexible wiring system according to the first embodiment of the invention will be described with reference to FIGS. 1-4.

Figure 1:
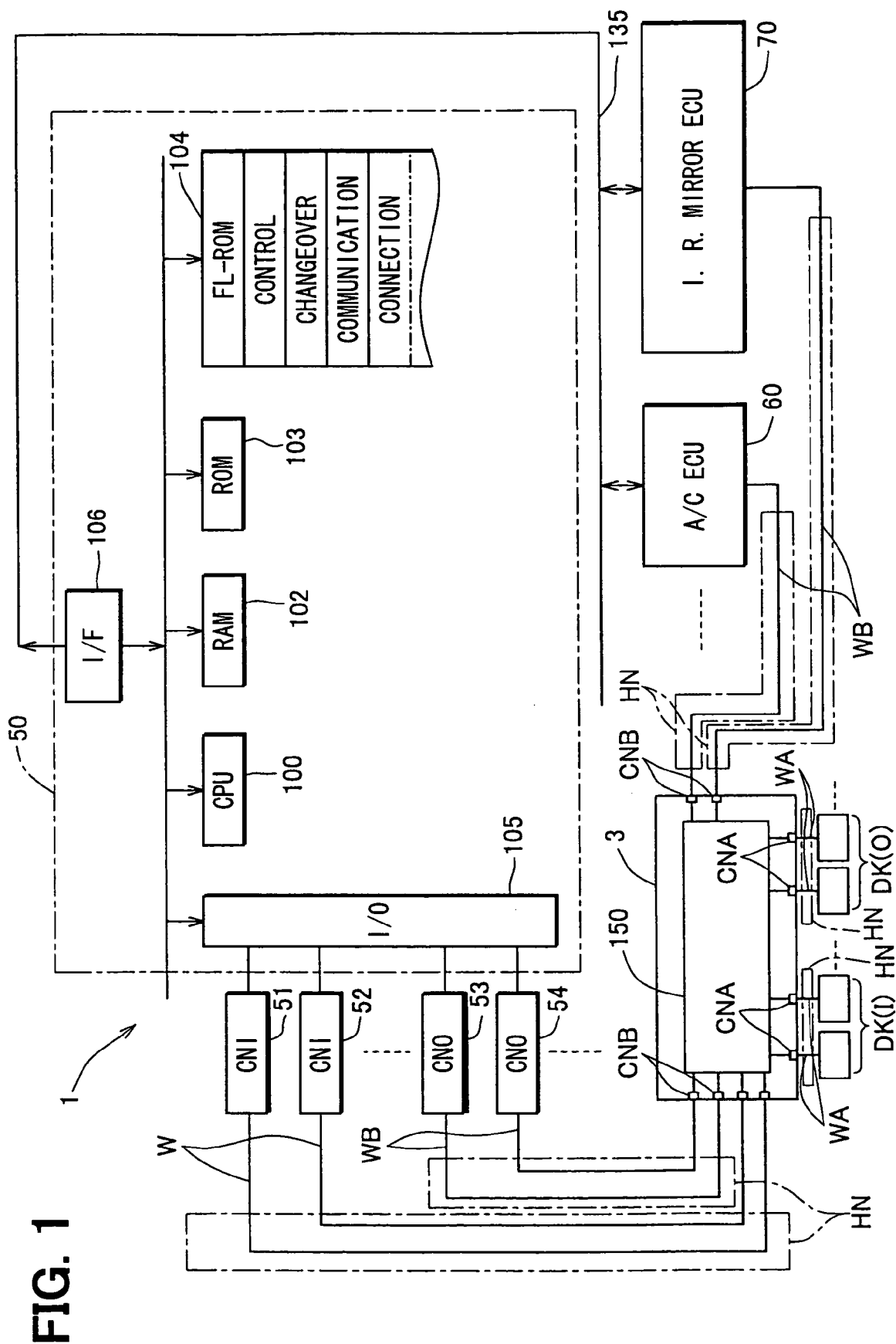
FIG. 1 is a block diagram illustrating an overview of a hardware of a flexible wiring system according to the present invention applied to an electronic system for a vehicle.

As shown in FIG. 1, a vehicle electronic system 1 includes an intermediate distributing unit or a junction box 3, plural inputting electronic devices DK(I), plural outputting electronic devices DK(O), a basic control unit 50, a air conditioning ECU 60 and an inside rear view mirror ECU 70, each of which control the outputting electronic devices DK(O) based on the signals of the inputting electronic devices DK(I) in preset manners. A flexible wiring system is mainly formed of the basic control unit 50 and the intermediate distributing unit 3.

The intermediate distributing unit 3 has a connection changeover mechanism 150, plural A-side connectors CNA and plural B-side connectors CNB. The inputting and outputting electronic devices DK(I), DK(O) are respectively connected by wires WA and WB with the basic control unit 50, the air conditioning ECU 60, and the inside rear view mirror 70 via the A-side and the B-side connectors CNA, CNB of the intermediate distributing unit 3, input side connectors (CNI) 51, 52 and output side connectors (CNO) 53, 54.

The wires WA and WB are respectively accommodated in wire harnesses HN that are respectively located at specific areas of a vehicle. The connection changeover mechanism 150 includes a wiring arrangement, plural changeover switches for connecting or disconnecting one or some of the A-side connectors CNA with or from any one or some of the B-side connectors. The wiring arrangement includes bus bars for supplying power and printed wires for supplying signals. The switches include relay switches for switching power and analog switches for switching signals. The details of the connection changeover mechanism will be described later with reference to FIG. 14.

The basic control unit 50 includes a CPU 100, a RAM 102, a ROM 103, a flash ROM 104, an I/O port 105 and a communication I/F circuit 106, which are connected each other by a bus bar in a usual manner. The flash ROM 104 stores device controlling application programs, a changeover control program, a communication software and connection setting data. The CPU 100, RAM 102, ROM 103 and the flash ROM 104, the I/O port 105 are connected with a serial bus bar 135, which connects to the air condition ECU 60 and the inside rear view mirror ECU 70, via the communication I/F circuit 106. The I/O port 105 is connected with B-side connectors CNB of the intermediate distributing unit 3 via the input side connectors 51, 52 and the output-side connectors 53, 54.

Figure 2:
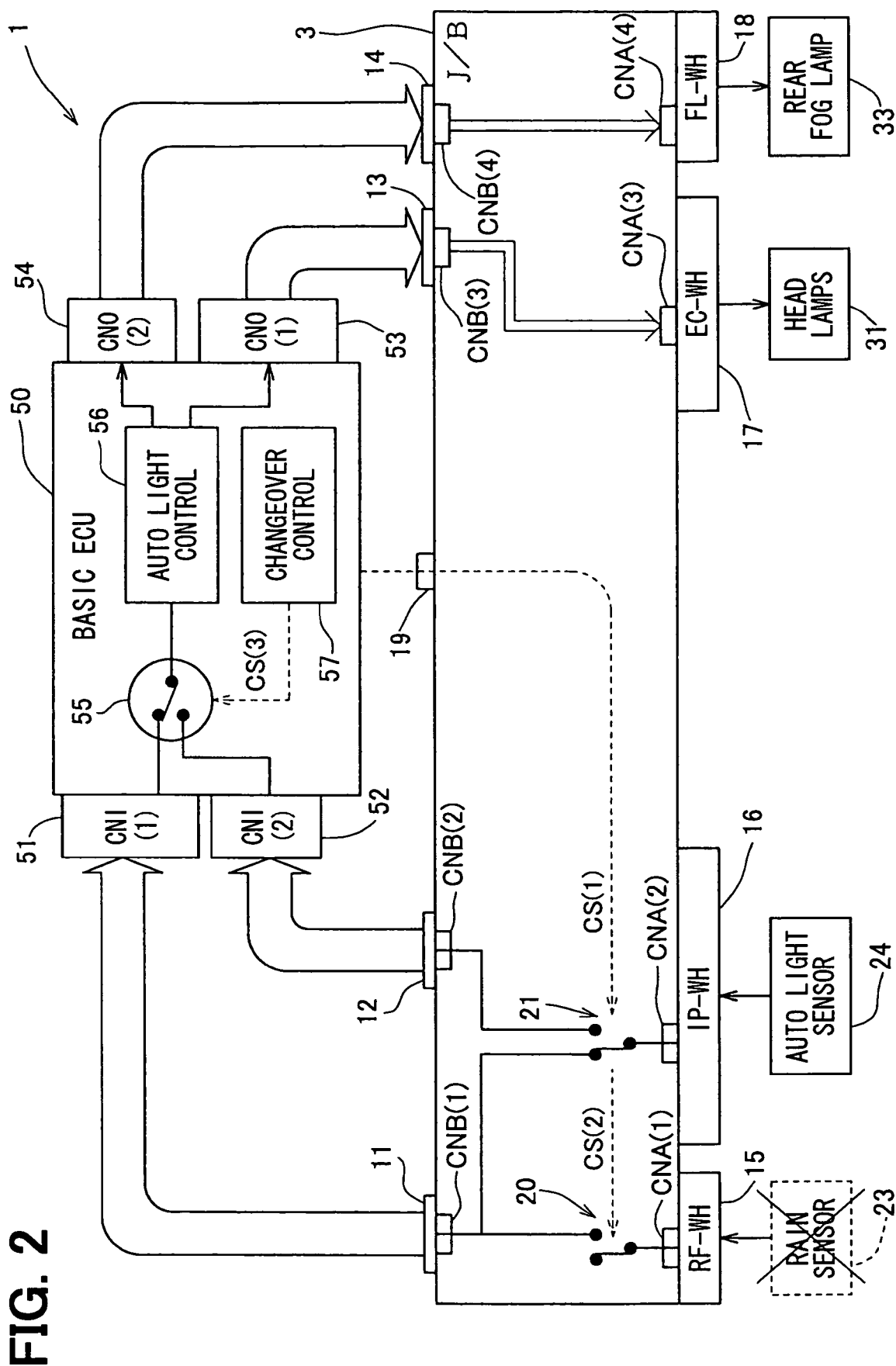
FIG. 2 is a block diagram of a flexible wiring system according to the first embodiment of the invention.

As shown in more detail in FIG. 2, the intermediate distributing unit 3 includes the first-fourth A-side connectors CNA(1), CNA(2), CNA(3), CNA(4), the first-fourth B-side connectors CNB(1), CNB(2), CNB(3), CNB(4), switches 20, 21 of the switchover mechanism 150. The basic control unit 50 includes a changeover circuit 55 and an auto-light control circuit 56.

A rain sensor 23, which is one of the inputting electronic devices connected with the first A-side connectors CNA(1) via the roof wire harness 15, is disconnected from the basic control unit 50. On the other hand, an auto light sensor 24, which is also one of the inputting electronic devices, is connected with the basic control unit 50 via the second A-side connectors CNA(2), the instrument panel wire harness 16 and the first input side connector 51. Incidentally, the rain sensor 23 detects an amount of rain drops for controlling a wiper device, and the auto light sensor 24 detects an intensity of outside light for controlling head lamps 31. Head lamps 31 are connected with the third A-side connectors CNA(3) via an engine compartment wire harness 17, and the rear fog lamps 33 are with the fourth A-side connector CNA(4) via a floor wire harness 18.

The switchover mechanism 150 includes a changeover switch 20 and a changeover switch 21 disposed between the first and second B-side connectors CNB(1), CNB(2) and the first and second A-side connectors CNA(1), CNA(2). The first B-side connector CNB(1) is connected by a wire harness 11 to the first input side connector 51 of the controller 50, and the second B-side connector CNB(2) is connected by a wire harness 12 to the second input side connector 52. The first B-side connector CNB(1) is connected by the changeover switch 21 with the second A-side connectors CNA(2) and disconnected by the changeover switch 20 from the first A-side connector CNA(1).

Figure 3:
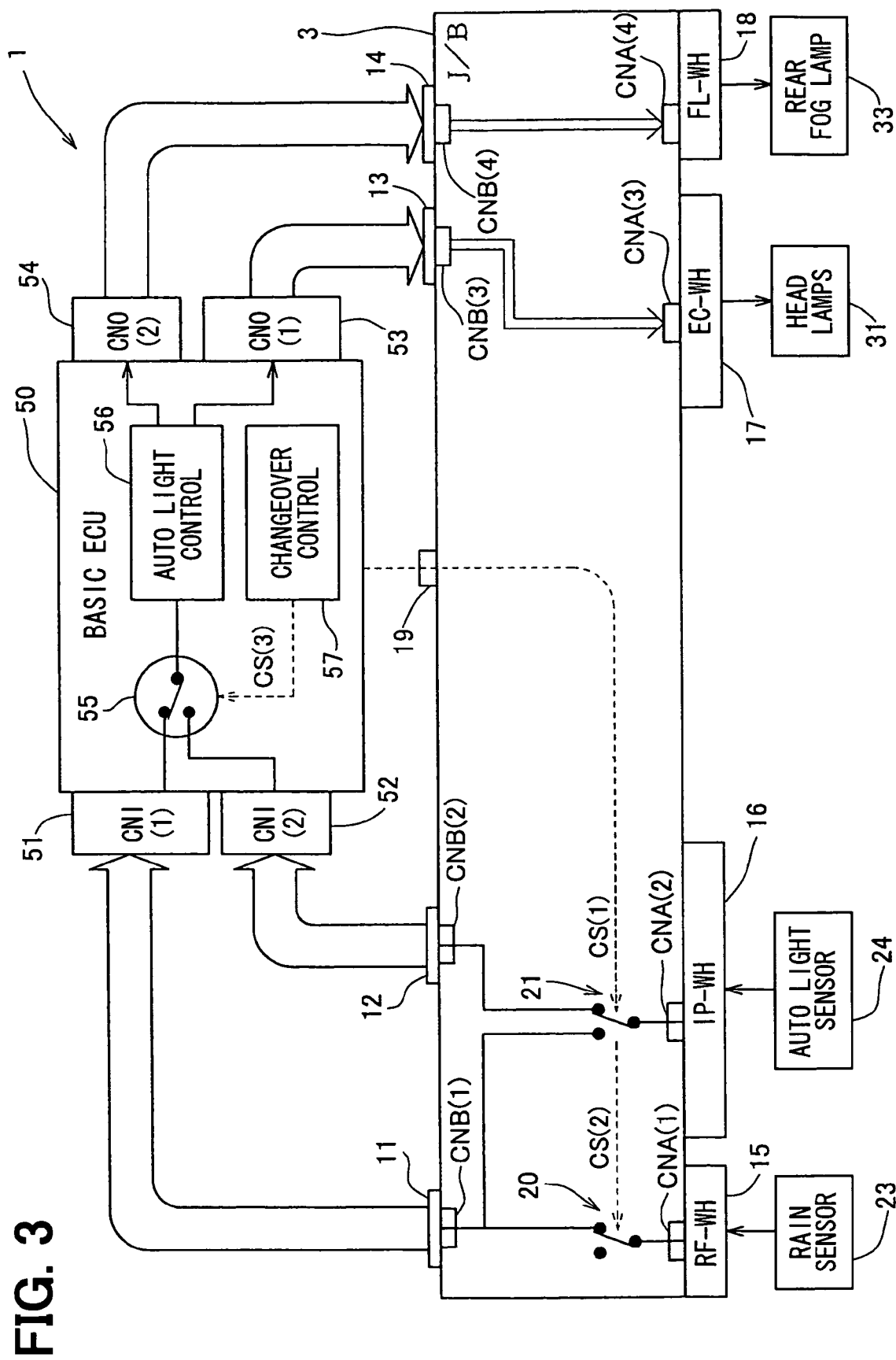
FIG. 3 is a block diagram of a flexible wiring system according to the first embodiment of the invention.

Incidentally, The second B-side connector CNB(2) is disconnected by the changeover switch 21 from the second A-side connector CNA(2) when the B-side connector CNB(1) is connected by the changeover switch 20 with the A-side connector CNA(1). That is, the changeover switches 20, 21 can switch over the connection of the B-side connector CNB(1) from the roof harness 15 to the instrument panel harness 16 so that the auto light sensor 24 can connect with the control unit 50 via the wire harness 11 instead of the rain sensor 23, or the connection of the second A-side connector CNA(2) from the first B-side connector CNB(1) to the second B-side connector CNB(2) so that the auto light sensor 24 can connect with the control unit 50 via the wire harness 12 and the input-side connector 52, as shown in FIG. 3.

The changeover operation of the changeover switches 20, 21 is controlled by the control unit 50 with a device changeover control circuit 57 operates according to the changeover control program. The operation will be described with reference to FIG. 4.

When the device changeover control circuit 57 starts, what is to be changed (the rain sensor, the auto light sensor or the control unit 50) is read at step S1 of a changeover control program, and the control unit 50 delivers changeover signals CS(1), CS(2) via a signal wire and a connector 19 to the changeover mechanism 150 so that the changeover switches 20, 21 are operated so that the auto light sensor 24 can be connected with the input-side connector 51 of the control unit 50 at S2. At the same time, a control program to be applied is read at S3. Then, whether the devices to be changed are inputting devices or not is examined at S4.

If the result of examination at S4 is Yes, the device changeover control circuit 57 delivers a changeover signal CS3 to the changeover circuit 55 to change over the connection of the auto-light control circuit 56 from the input side connector 52 to the input side connector 51 at S5. Incidentally, the rain sensor 23 is connected with a wiper control circuit, which is not shown, and the changeover circuit 55 may be a soft ware.

If the result of examination at S4 is No on the other hand, whether the devices to be changed are outputting devices or not is examined at S6 and the changeover control circuit 57 controls a changeover circuit 255 to connect a certain control circuit with one of the first and second output side connectors 53, 54 to the other that is connected with a certain outputting device at S7, which will be described later with reference to FIG. 7.

Figure 5:
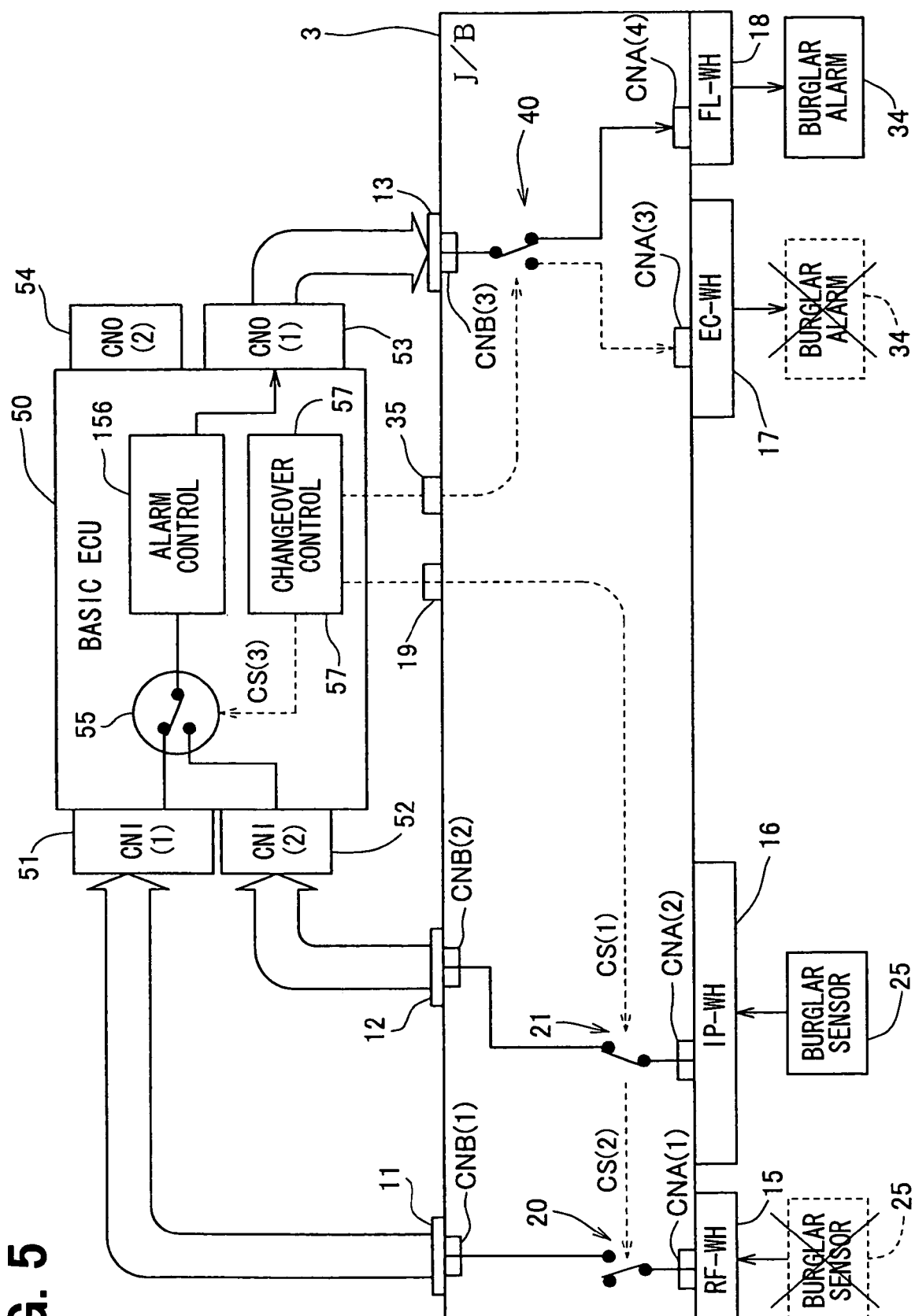
FIG. 5 is a block diagram of a flexible wiring system according to the second embodiment of the invention.
Figure 6:
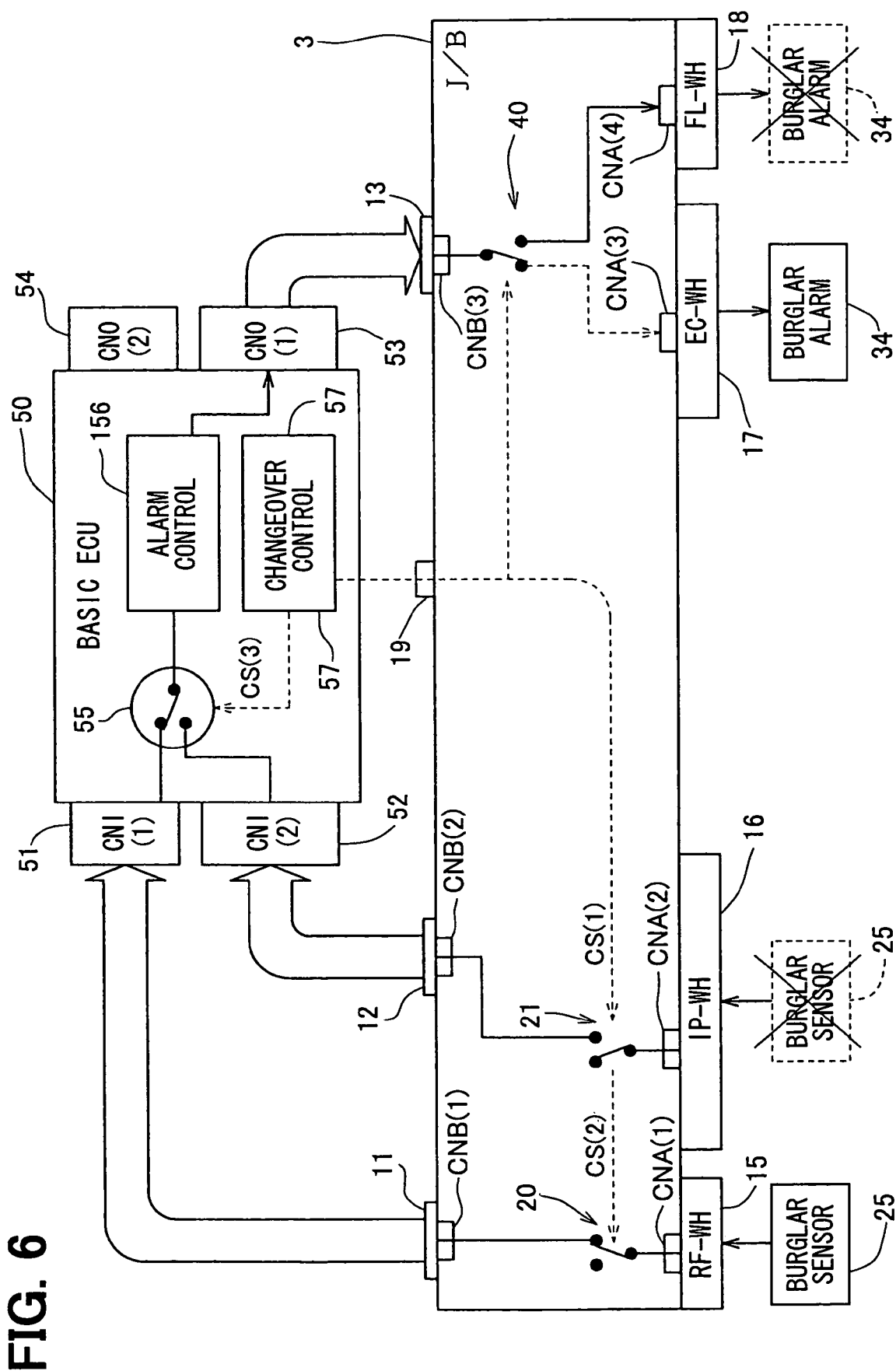
FIG. 6 is a block diagram of a flexible wiring system according to the second embodiment of the invention.

A flexible wiring system according to the second embodiment of the invention will be described with reference to FIGS. 5 and 6.

A burglar sensor 25, which was connected with the control unit 50 via the input side connector 51, the first A-side connectors CNA(1) and the roof wire harness 15, is connected with the input side connector 52 via the second A-side connectors CNA(2) and the instrument panel wire harness 16. Incidentally, the burglar sensor 25 detects an intruder breaking into the passenger compartment of a vehicle for operating a burglar alarm (or security horn) 17. The connection with the second output side connector 53 via the third A-side connector CNA(3) and the engine compartment wire harness 17 of the burglar alarm 34 is changed to the connection via the fourth A-side connector CNA(4) and the floor wire harness 18. The switchover mechanism 150 includes the changeover switches 20 and 21.

The first B-side connector CNB(1) is connected by a wire harness 11 to the input side connector 51 of the controller 50, and the second B-side connector CNB(2) is connected by a wire harness 12 to the second input side connector 52. If the first A-side connectors CNA(1) is disconnected by the changeover switch 20 from the B-side connector CNB(1), the second A-side connector CNA(2) is connected with the second B-side connector CNB(2), as shown in FIG. 5. If the second A-side connectors CNA(2) is disconnected by the changeover switch 21 from the second B-side connector CNB(2), the first A-side connector CNA (1) is connected by the changeover switch 20 with the first B-side connector CNB(1), as shown in FIG. 6. Thus, the connecting operation of the first A-side connector CNA(1) with the first B-side connector CNB(1) and the connecting operation of the second A-side connector CNA(2) with the second B-side connector CNB(2) are exclusive or opposite to each other.

The third B-side connector CNB(3) is connected by the wire harness 13 to the output side connector 53 of the controller 50. If the fourth A-side connectors CNA(4) is connected by the changeover switch 40 to the third B-side connector CNB(3) as shown in FIG. 5, the third A-side connector CNA (3) is disconnected by the changeover switch 40 from the third B-side connector CNB(3). If the third A-side connectors CNA(3) is connected by the changeover switch 40 to the third B-side connector CNB(3) as shown in FIG. 6, the fourth A-side connector CNA (4) is disconnected by the changeover switch 40 from the third B-side connector CNB (3). Thus, the connecting operation of the third A-side connector CNA(3) with the third B-side connector CNB(3) and the connecting operation of the fourth A-side connector CNA (4) with the third B-side connector CNB(3) are exclusive to each other.

Figure 4:
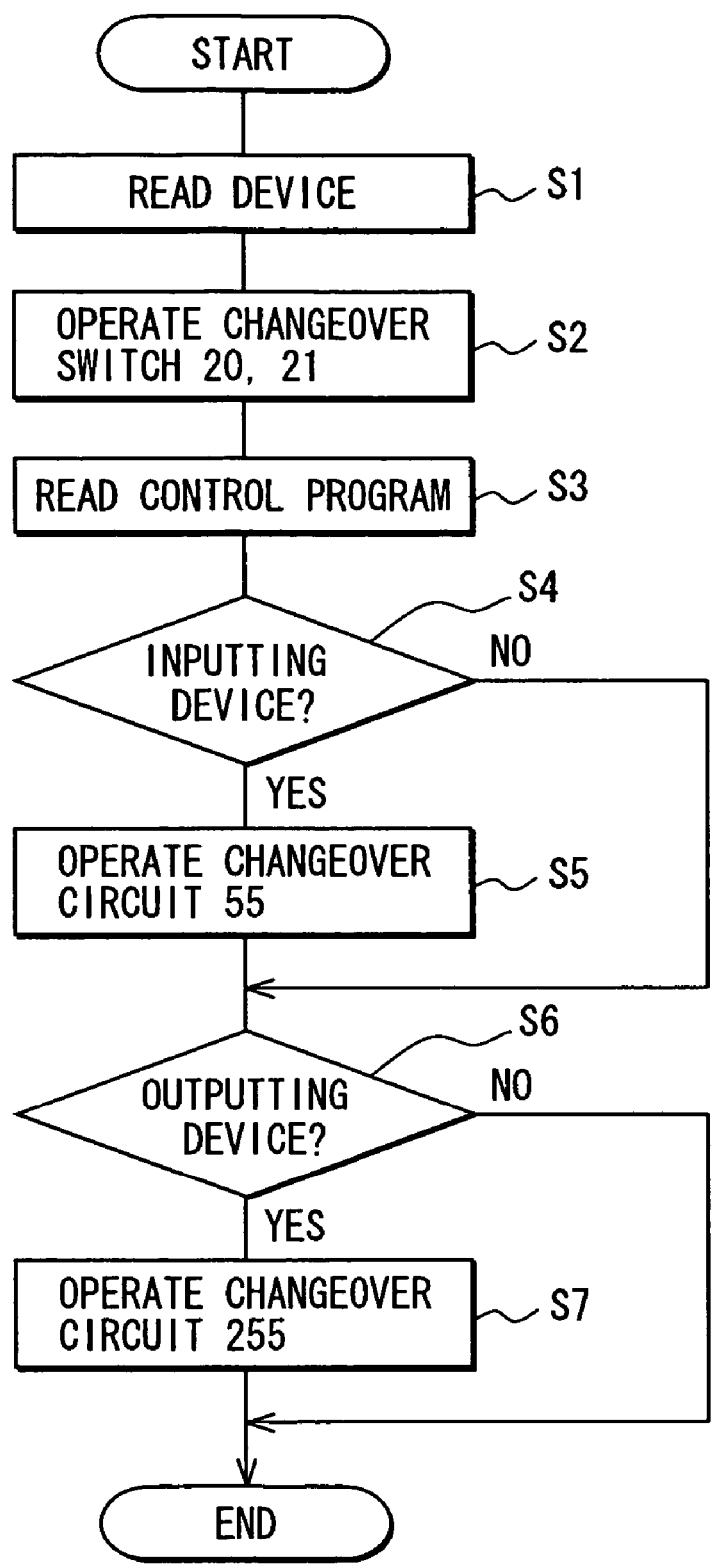
FIG. 4 is a flow diagram of a control program to be applied to the flexible wiring systems shown in FIGS. 2 and 3.

If the result of examination at S4 of the flow diagram shown in FIG. 4 is No, whether the device to be changed is an outputting device or not is examined at S6, and the changeover control circuit 57 controls the changeover switch 40 to connect the third A-side connector CNA(3) that is connected with the burglar alarm 34 with the third B-side connector CNB(3), which is connected with the alarm control circuit 156 via the output side connector 53, at S7 if the result of S6 is Yes. Otherwise, the changeover control program ends.

Figure 7:
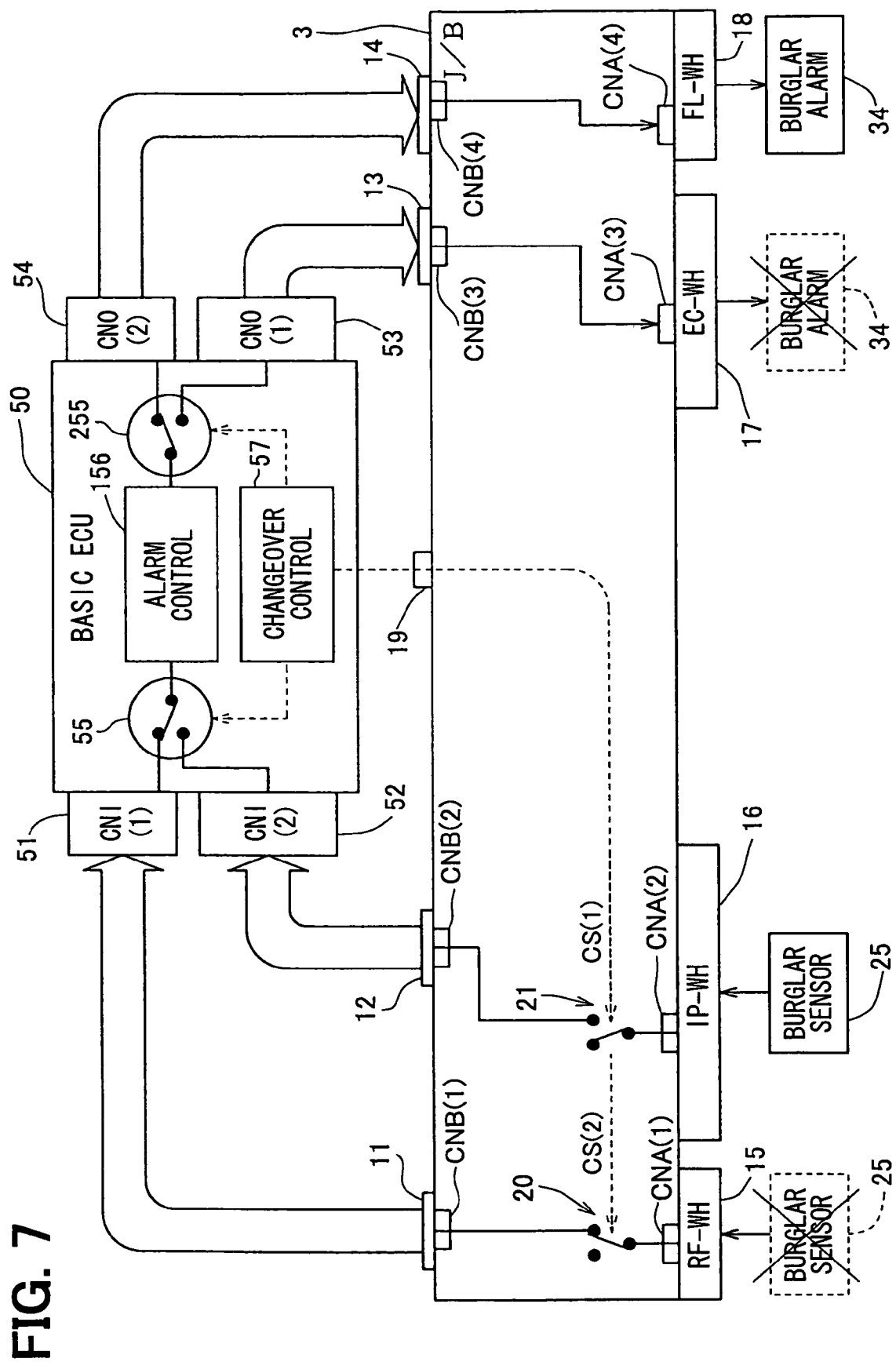
FIG. 7 is a block diagram of a modified flexible wiring system according to the second embodiment of the invention.

As a modification of the second embodiment, direct connection between the third A-side connector CNA(3) and the third B-side connector CNB(3) and the direct connection between the fourth A-side connector CNA(4) and the fourth B-side connector CNB(4) can be attained if another changeover circuit 255 is disposed in the control circuit 50 between the alarm control circuit 156 and the first and second output side connectors 53, 54, as shown in FIG. 7.

In the case that the burglar alarm 34 is connected with the fourth A-side connector CNA(4) via the floor wire harness, the changeover control circuit 57 controls the another changeover circuit 255 to connect the burglar alarm control circuit 156 with the third B-side connector CNB(3) via the output side connector 53 at S7 if the result of S6 is Yes.

Figure 8:
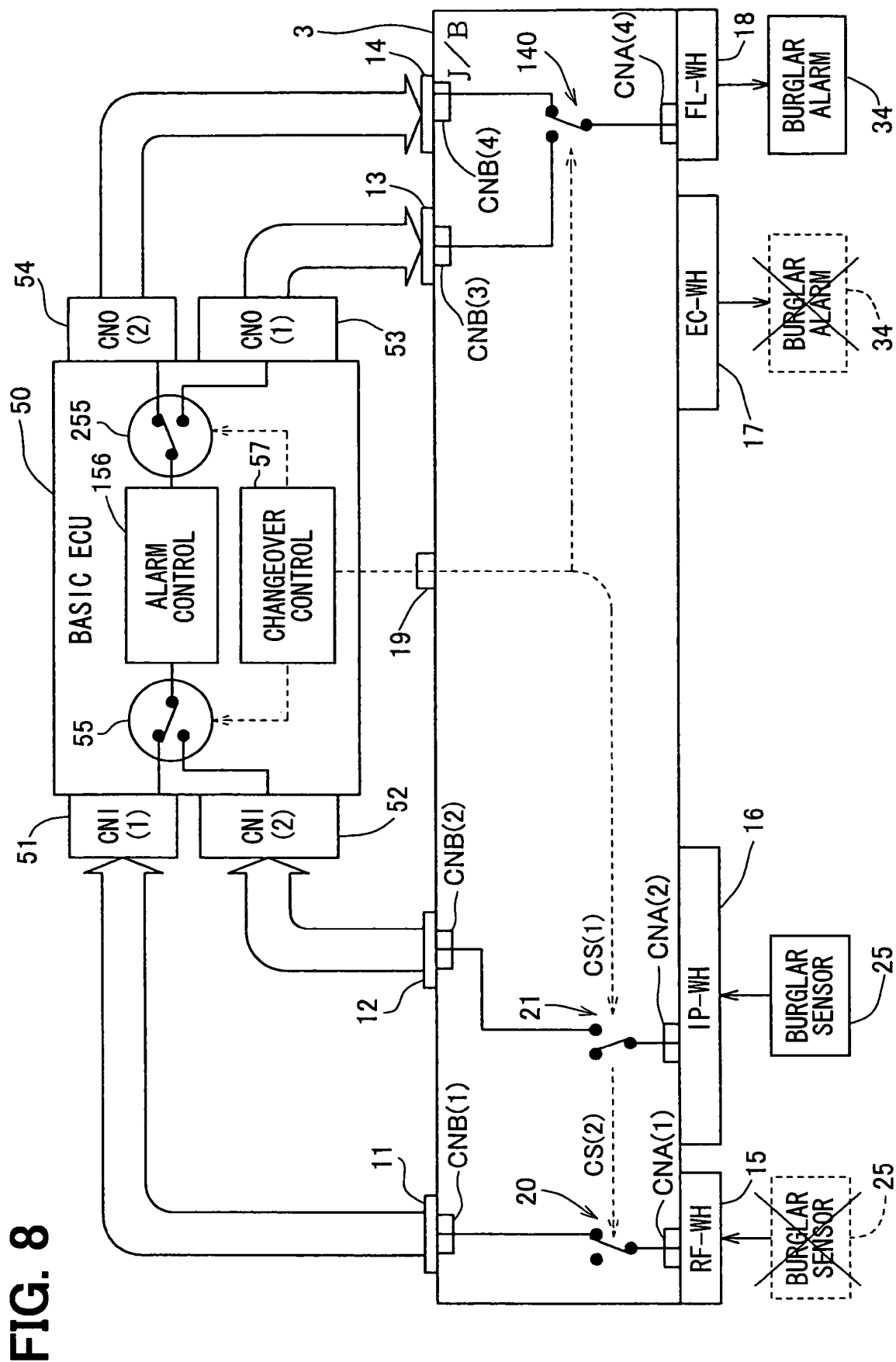
FIG. 8 is a block diagram of a modified flexible wiring system according to the second embodiment of the invention.

As shown in FIG. 8, the burglar alarm 34 that is connected with the fourth A-side connector CNA(4) can be connected with either the third B-side connector CNB(3) that is connected with the output side connector 53 or the fourth B-side connector CNB(4) that is connected with the output side connector 54, if another changeover circuit 255 is disposed in the control circuit 50 between the alarm control circuit 156 and the first and second output side connectors CNO(1), CNO(2), and another changeover switch 140 is disposed in the switchover mechanism between the fourth A-side connector CNA(4) and the third and fourth B-side connectors CNB(3), CNB(4).

In this case, the changeover control circuit 57 controls the another changeover circuit 255 and the changeover switch 140 to connect the fourth A-side connector CNA(4) with the alarm control circuit 156 via the output side connector 54 at S7 if the result of S6 is Yes.

Figure 9:
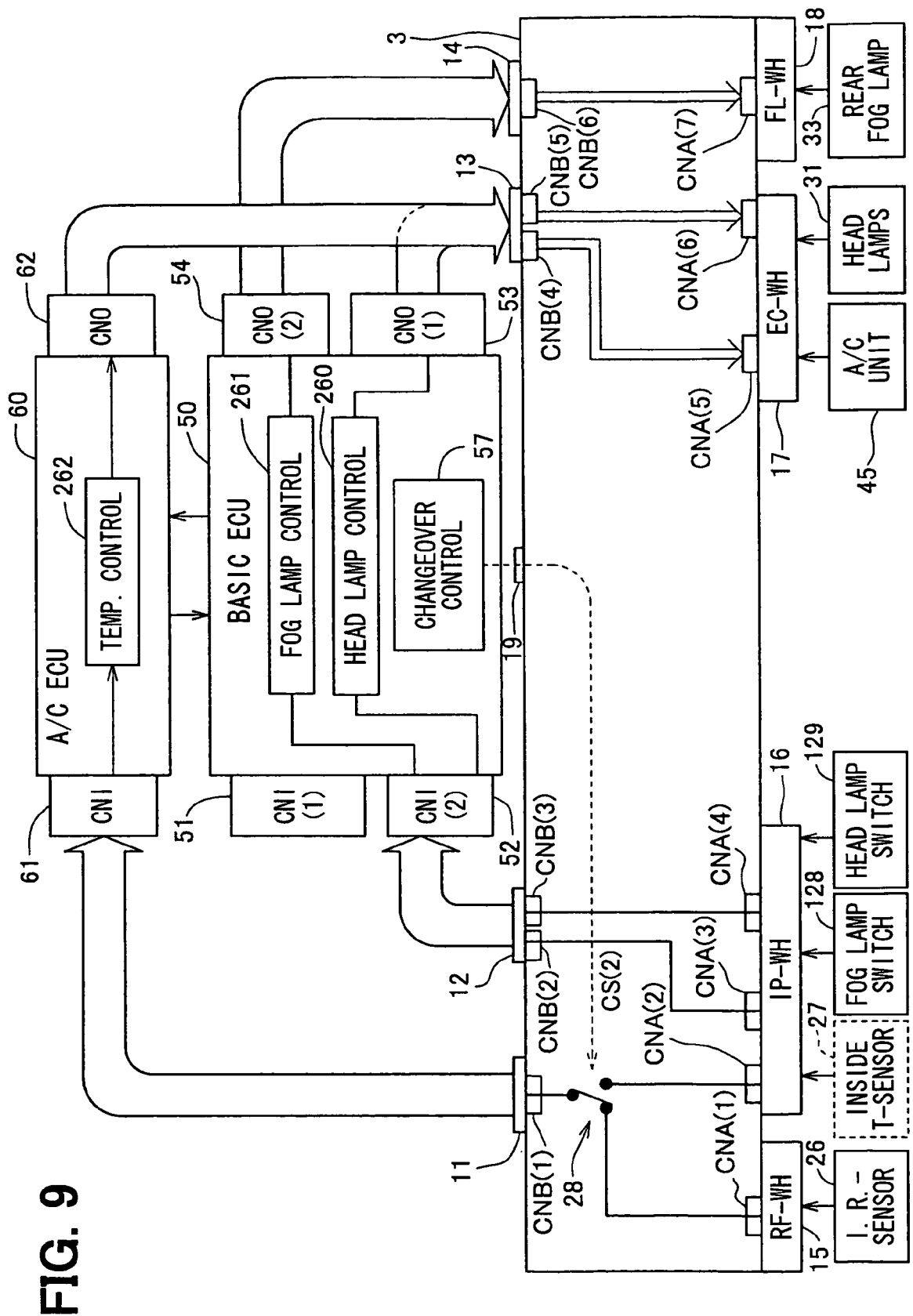
FIG. 9 is a block diagram of a flexible wiring system according to the third embodiment of the invention.

A flexible wiring system according to the third embodiment of the invention will be described with reference to FIGS. 9 and 10.

The flexible wiring system is to connect an air condition control system (A/C ECU) 60 with its inputting device, such as an infrared light sensor 26 or an inside air temperature sensor 27 and an outputting device, such as an air condition unit 45 in addition to various inputting devices and outputting devices already connected.

The intermediate distributing unit 3 includes the first A-side connectors CNA(1) connected via the roof wire harness 15 with the infrared light (IR) sensor 26, the second A-side connector CNA(2), the third A-side connector CNA(3), the fourth A-side connector CNA(4), three of which are respectively connected through the instrument panel wire harness 16 with an inside air temperature sensor 27, a rear fog lamp switch 128, which is connected via the instrument panel wire harness 16 with a room temperature control circuit 262 of the air condition ECU 60, and a head lamp switch 129, which is connected via the instrument panel wire harness 16 with a head lamp control circuit disposed in the basic control unit 50, the fifth A-side connector CNA(5) and the sixth A-side connector CNA(6), both of which are respectively connected via the engine compartment wire harness 17 with an air condition unit 45, and head lamps 31 and the seventh A-side connector CNA(7) connected with rear fog lamps 33 via the floor wire harness 18. The intermediate distributing unit 3 further includes the first B-side connector CNB(1) connected with an input side connector 61 of the air condition ECU 60 via the wire harness 11, the second B-side connector CNB(2), the third B-side connector CNB(3) both of which are connected via the wire harness 12 with the input side connector 52 of the basic control unit 50, the fourth B-side connector CNB(4), the fifth B-side connector CNB(5) both of which are connected with an output side connector 62 of the air condition ECU 60 and the sixth B-side connector CNB(6). The changeover mechanism 3 also includes a changeover switch 28 disposed between the first B-side connector CNB(1) and a pair of the first and the second A-side connectors CNA(1), CNA(2).

Figure 10:
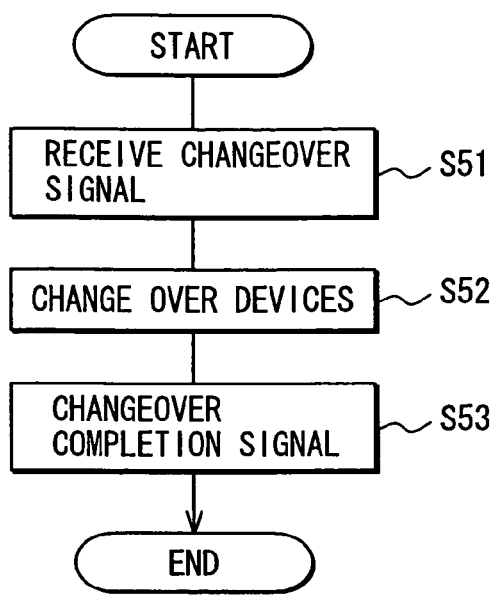
FIG. 10 is a flow diagram of a control program to be applied to the flexible wiring systems shown in FIG. 9.

The changeover program of the control unit 50 operates as shown in FIG. 10. The control unit 50 receives information from the air condition ECU 60 about which of the devices (IR sensor 26 or the inside air temperature sensor 27) is to be connected with which of the connectors 61, 62 at S51. Thereafter, the changeover control circuit 57 disposed in the control unit 50 controls the changeover switch 28 so as to disconnect the first B-side connector CNB(1) that is connected with the input side connector 61 of the air condition ECU 60 from the second A-side connector CNA(2) that is connected with the temperature sensor and connect the first B-side connector CNB(1) with the first A-side connector CNA (1) that is connected with the IR sensor 26 (the selected device) at S52. When the changeover operation is completed, a completion signal is sent to the air condition ECU 60 at S53.

Figure 11:
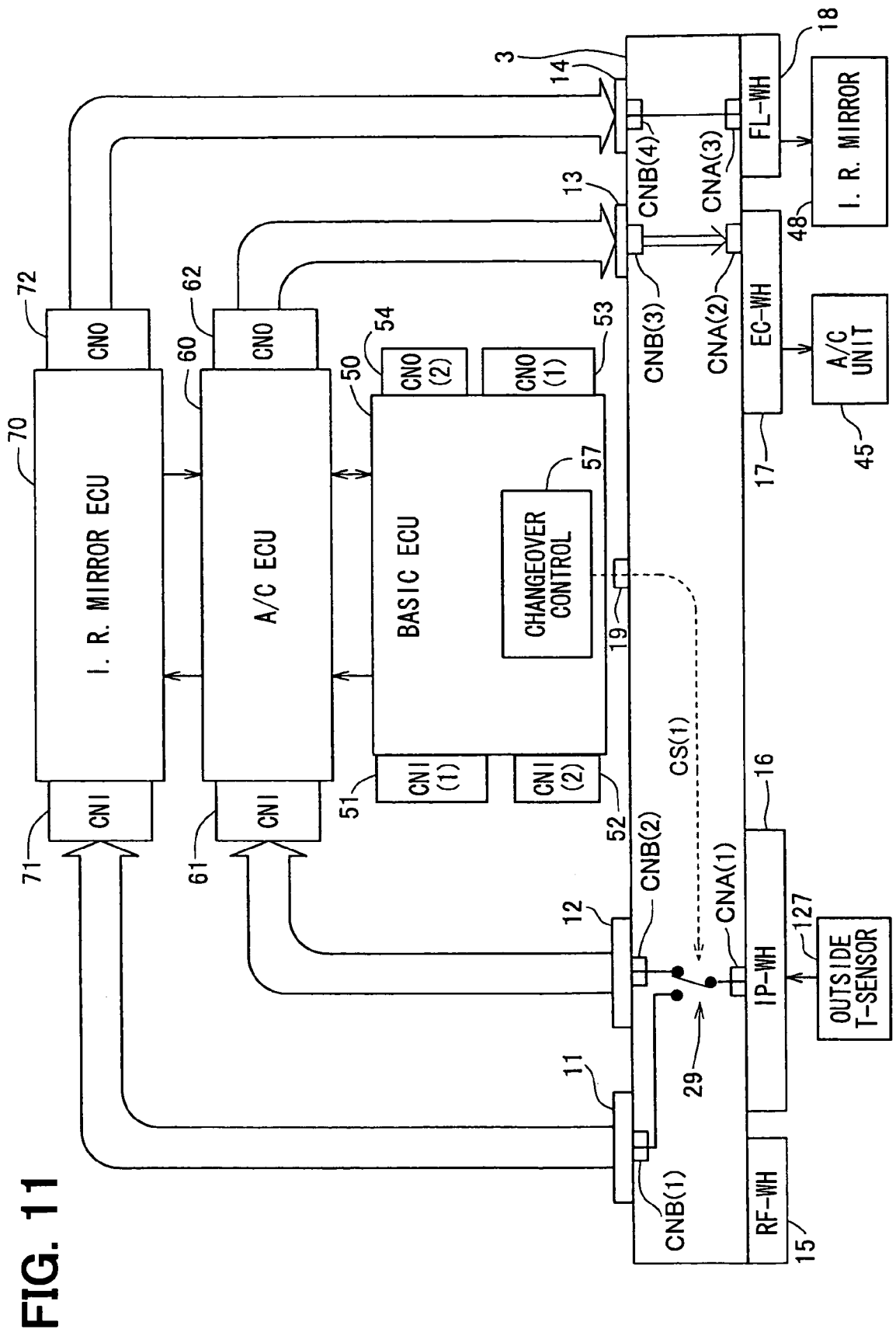
FIG. 11 is a block diagram of a flexible wiring system according to the fourth embodiment of the invention.

A flexible wiring system according to the fourth embodiment of the invention will be described with reference to FIGS. 11-13.

The flexible wiring system is to connect an inside rear view mirror ECU 70 with an inside rear view mirror 48 in addition to the air condition ECU 60, an outside temperature sensor 127 and the air condition unit 45, which are mounted in the vehicle as a standard equipment.

The air condition ECU 60 controls the air condition unit 45 according to the signal sent from the outside temperature sensor 127. The inside rear view mirror ECU 70 displays an outside temperature detected by the outside air temperature sensor 127 on a portion of the inside rear view mirror 48.

The intermediate distributing unit 3 includes the first A-side connectors CNA(1) connected via the instrument panel wire harness 16 with the outside temperature sensor 127, the second A-side connector CNA(2) connected via the engine compartment wire harness 17 with the air condition unit 45, the third A-side connector CNA(3) connected via the floor wire harness 18 with the inside rear view mirror 48. The intermediate distributing unit 3 further includes the first B-side connector CNB(1) connected with an input side connector 71 of the inside rear view mirror ECU 70 via the wire harness 11, the second B-side connector CNB(2) connected via the wire harness 12 with the input side connector 61 of the air condition ECU 60, the third B-side connector CNB(3) connected via the wire harness 13 with the output side connector 62 of the air condition ECU 60 and the fourth B-side connector CNB(4) connected with an output side connector 72 of the inside rear view mirror ECU 70. The changeover mechanism 3 also includes a changeover switch 29 disposed between the first A-side connector CNA(1) and a pair of the first and the second B-side connectors CNB(1), CNB(2). When the inside rear view mirror ECU 70 and the inside rear view mirror 48 are mounted as an optional system, the outside temperature sensor 127, which is already connected to the input side of the air condition control ECU 60, is not directly connected to the input side of the inside rear view mirror ECU 70 via the first B-side connector CNB(1). The data of the outside temperature sensor 127 taken by the air condition control ECU 60 is transmitted to the inside rear view mirror ECU 70 via a communication line to display an outside temperature.

Figure 12:
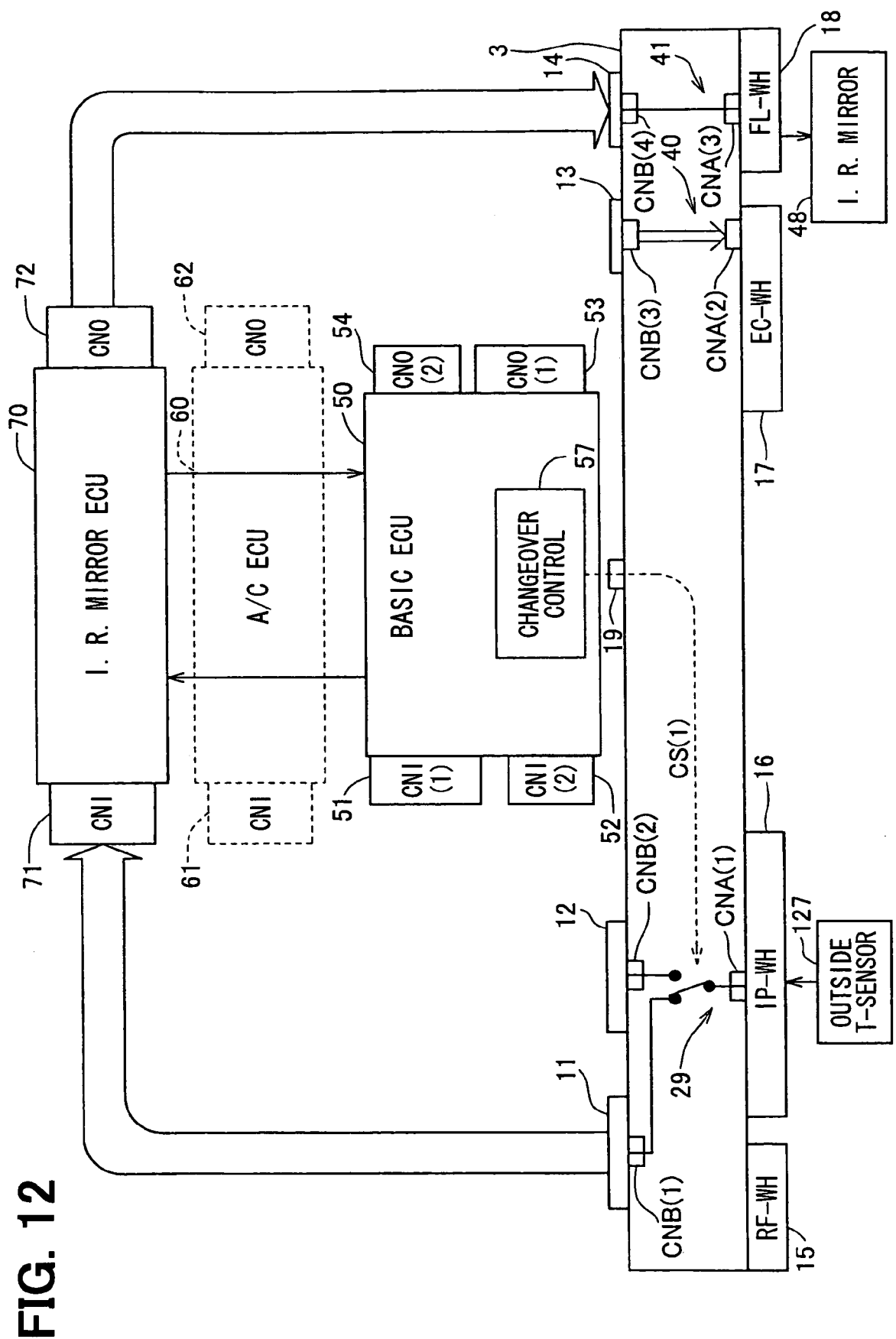
FIG. 12 is a block diagram of a flexible wiring system according to the fourth embodiment of the invention.

If a vehicle is sold in a cold district where the air conditioning is not usually necessary, the second B-side terminal CNB(2), the first A-side connector CNA(1), the third B-side connector (3) and the second A-side connector CNA(2) are reserved for the outside temperature sensor 127, the air condition ECU 60 and the air condition unit 45 to meet the user's demand for the air condition system, as shown in FIG. 12. In this case, the changeover switch 29 connects the first B-side connector CNB(1) with the first A-side connector CNA(1) so that the outside temperature sensor 127 can directly connect with the inside rear view mirror ECU 70.

Figure 13:
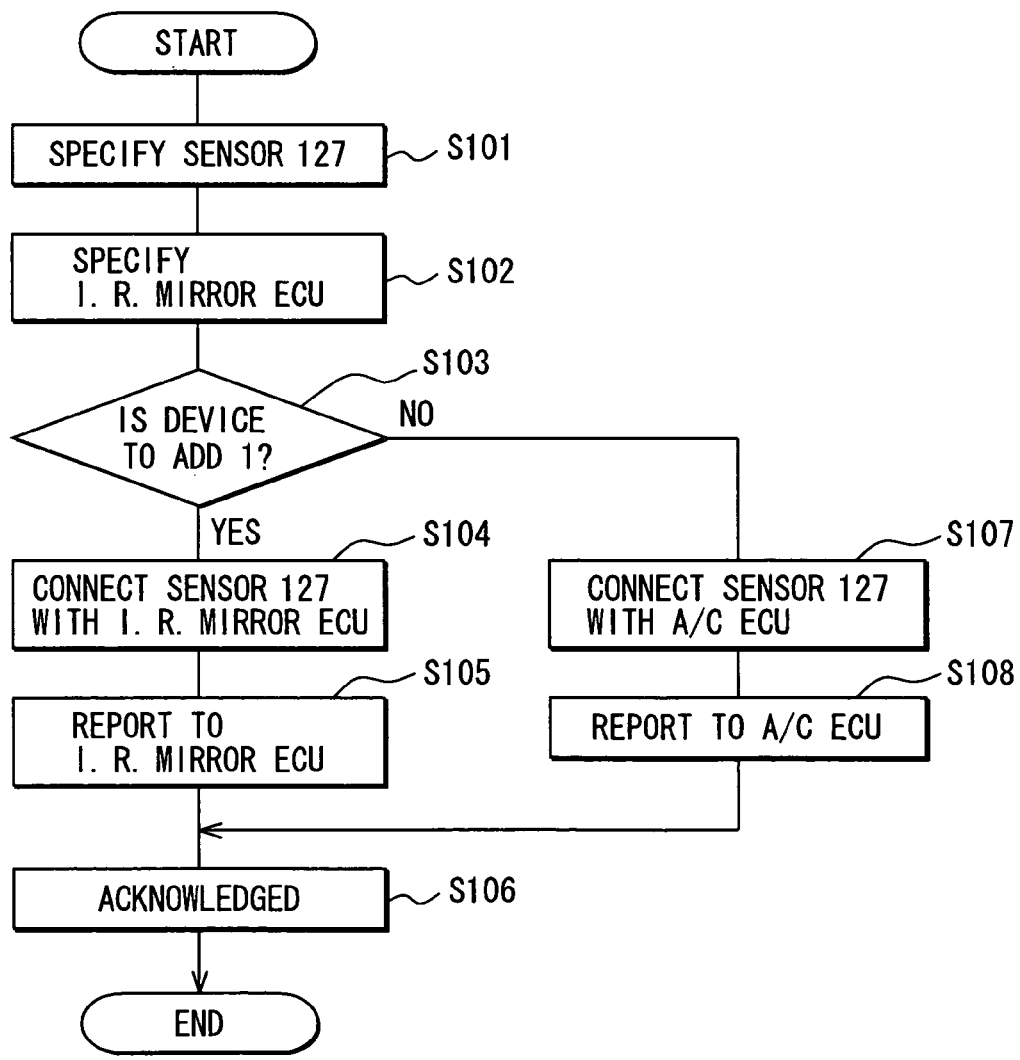
FIG. 13 is a flow diagram of a control program to be applied to the flexible wiring systems shown in FIGS. 11 and 12.

The changeover program of the control unit 50 operates as shown in FIG. 13.

At first, the outside temperature sensor 127 is specified at S101. Then, the inside rear view mirror ECU 70 as an additional ECU that requires the data detected by the outside temperature sensor 127 is specified at S102. Subsequently, whether the additional ECU is one or not is examined at S103.

If the result of the examination is Yes, the changeover switch 29 is controlled to connect the outside temperature sensor 127 with the inside rear view mirror ECU 70 at S104, and the completion of the connection is reported to the inside rear view mirror ECU 70 at S105. After an acknowledgement signal is received from the inside rear view mirror ECU 70 at S106, the program ends.

If the result of the examination at S103 is No, the changeover switch 29 is controlled to connect the outside temperature sensor 127 with the air condition ECU at S107, and the completion of the connection is reported to the air condition ECU 60 and instructs the same to deliver the inside rear view mirror ECU 70 the data detected by the outside temperature sensor 127 at S108. Thereafter, the step goes to S106.

Figure 14:
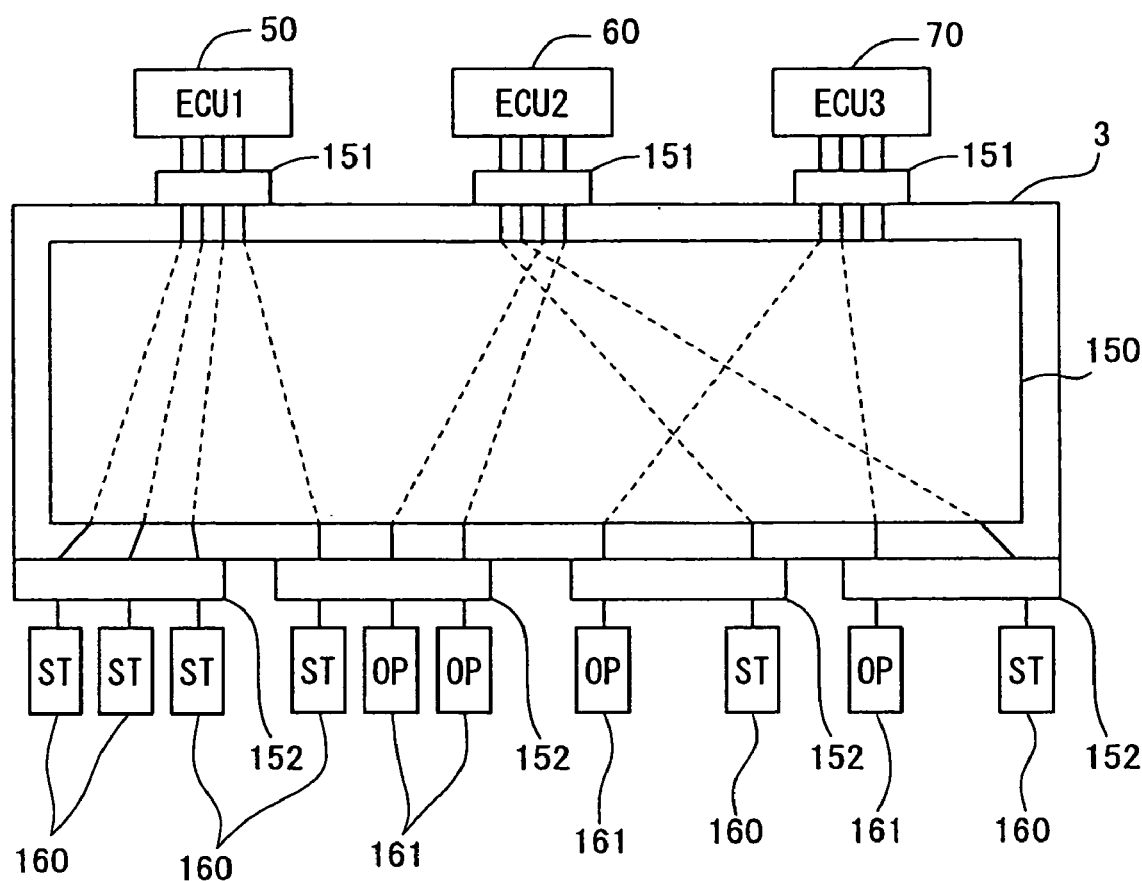
FIG. 14 is a schematic diagram of a flexible wiring system which includes another changeover mechanism.

Incidentally, an operation of the connection changeover mechanism 150 will be described with reference to FIGS. 14-15. The connection changeover mechanism 150 has a switch matrix that connects devices of standard equipment 160 and devices of optional equipment 161 with respective basic control unit (ECU) 50, ECU 60 and/or ECU 70 via wire harnesses 151, 152.

Figure 15:
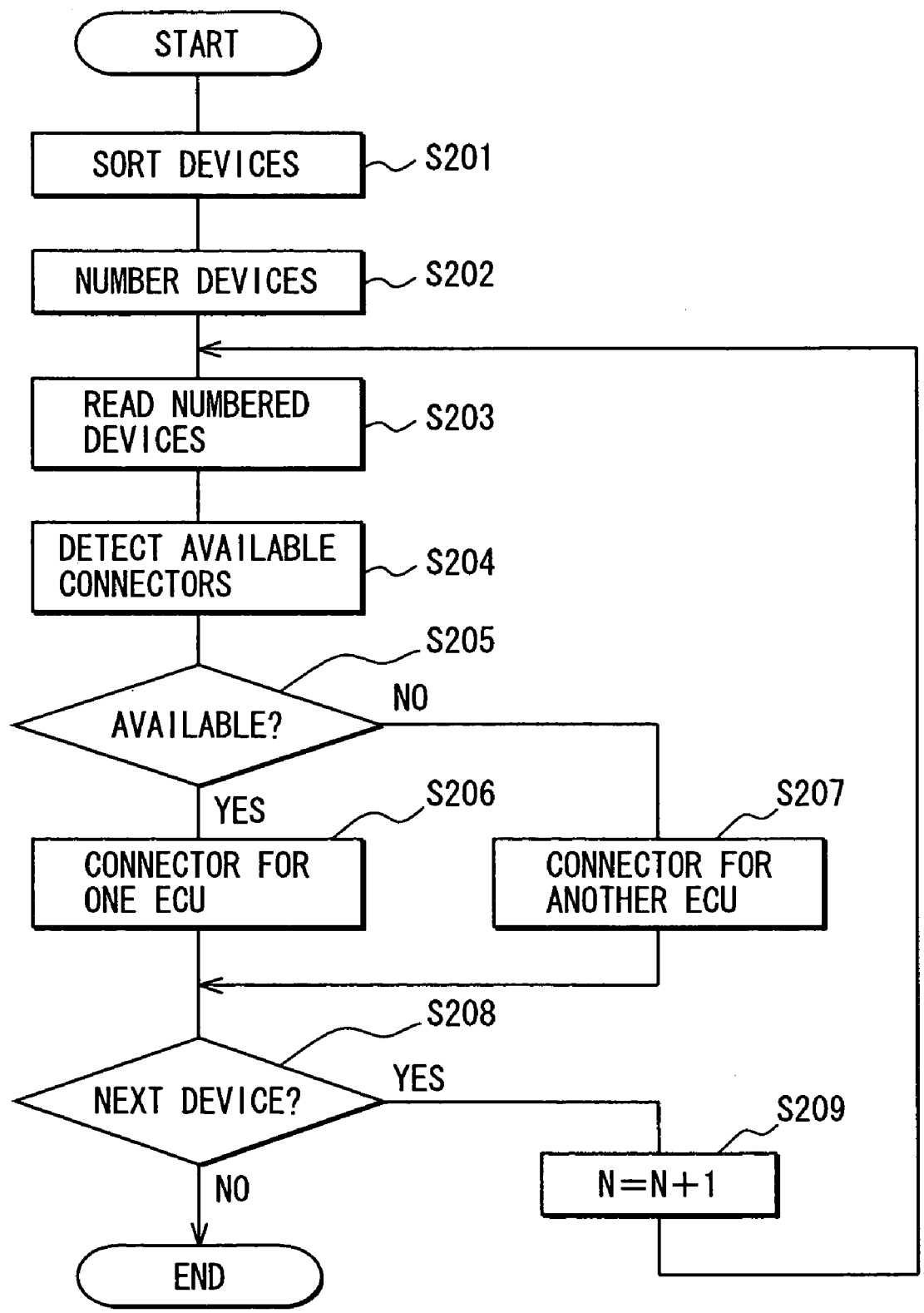
FIG. 15 is a flow diagram of a control program for controlling the changeover mechanism shown in FIG. 14.
Figures 16, 17, 18:
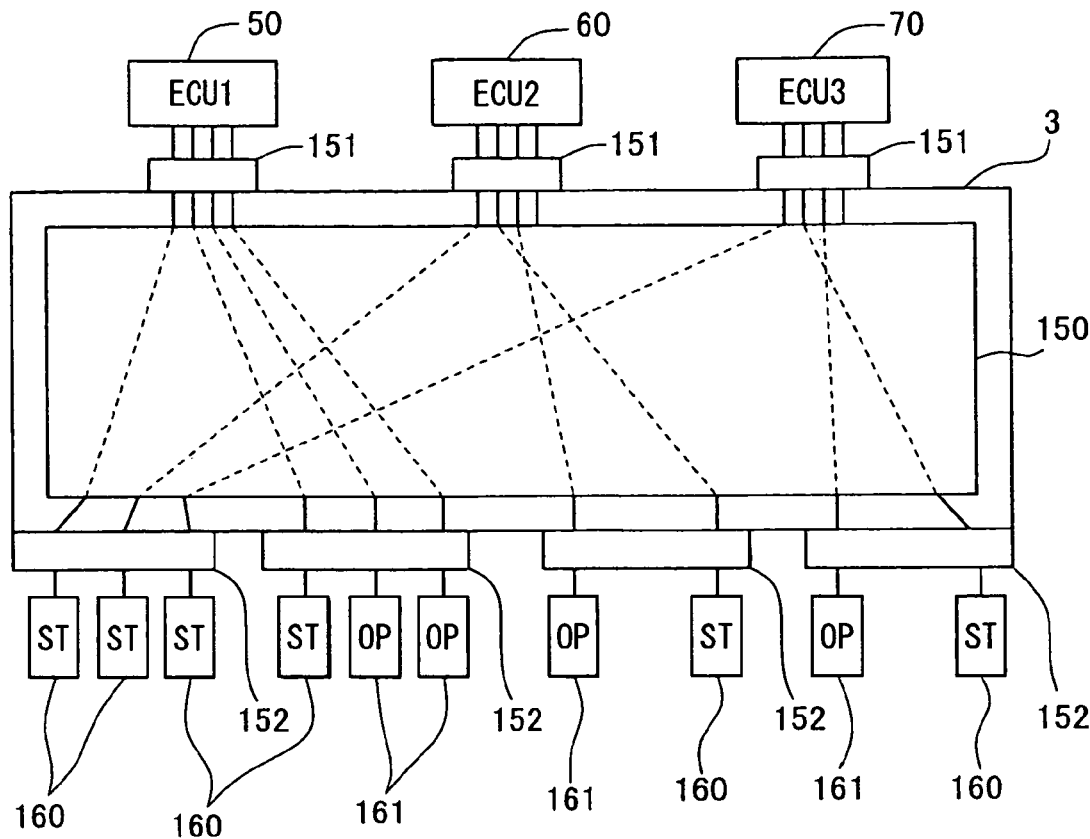
FIG. 16 is a schematic diagram of a flexible wiring system which includes another changeover mechanism.
FIG. 17 is a table of a map showing ratios of occupation time of a CPU of control units that respectively correspond to devices of standard equipment and devices of optional equipments.
FIG. 18 is a table showing counters of the control units that respectively count the ratios of occupation time thereof.

The connection is carried out as shown by a flow diagram in FIG. 15. Firstly, all devices of the standard and optional equipment to be connected with the intermediate distributing unit 3 are sorted at S201. Then, the devices of standard equipment and the devices of optional equipment are discriminately numbered so that the devices of the standard equipment can be given priority at S202. Then, each numbered device is read in sequence at S203 to find out an extra connector at S204 and S205. If an extra connector is available (Yes) for a certain device, a corresponding changeover switch of the changeover mechanism 150 is controlled to connect the certain device to the extra connector at S206. Therefore, the devices of standard equipment are first read to connect with the basic control unit 50. If any extra connector is not available (No), the step goes to S207, where a corresponding changeover switch is controlled to connect the certain device with an extra connector of an additional ECU. Thereafter, whether the next device to be connected is examined at S208, and the step returns to S203 via S209 until no other device to be connected is found.

Another operation of the connection changeover mechanism 150 will be described with reference to FIGS. 16-19. The connection changeover mechanism 150 has a switch matrix that connects devices of standard equipment 160 and devices of optional equipment 161 with respective control unit 50, ECU 60 and/or ECU 70 via wire harnesses 151, 152.

Figure 19:
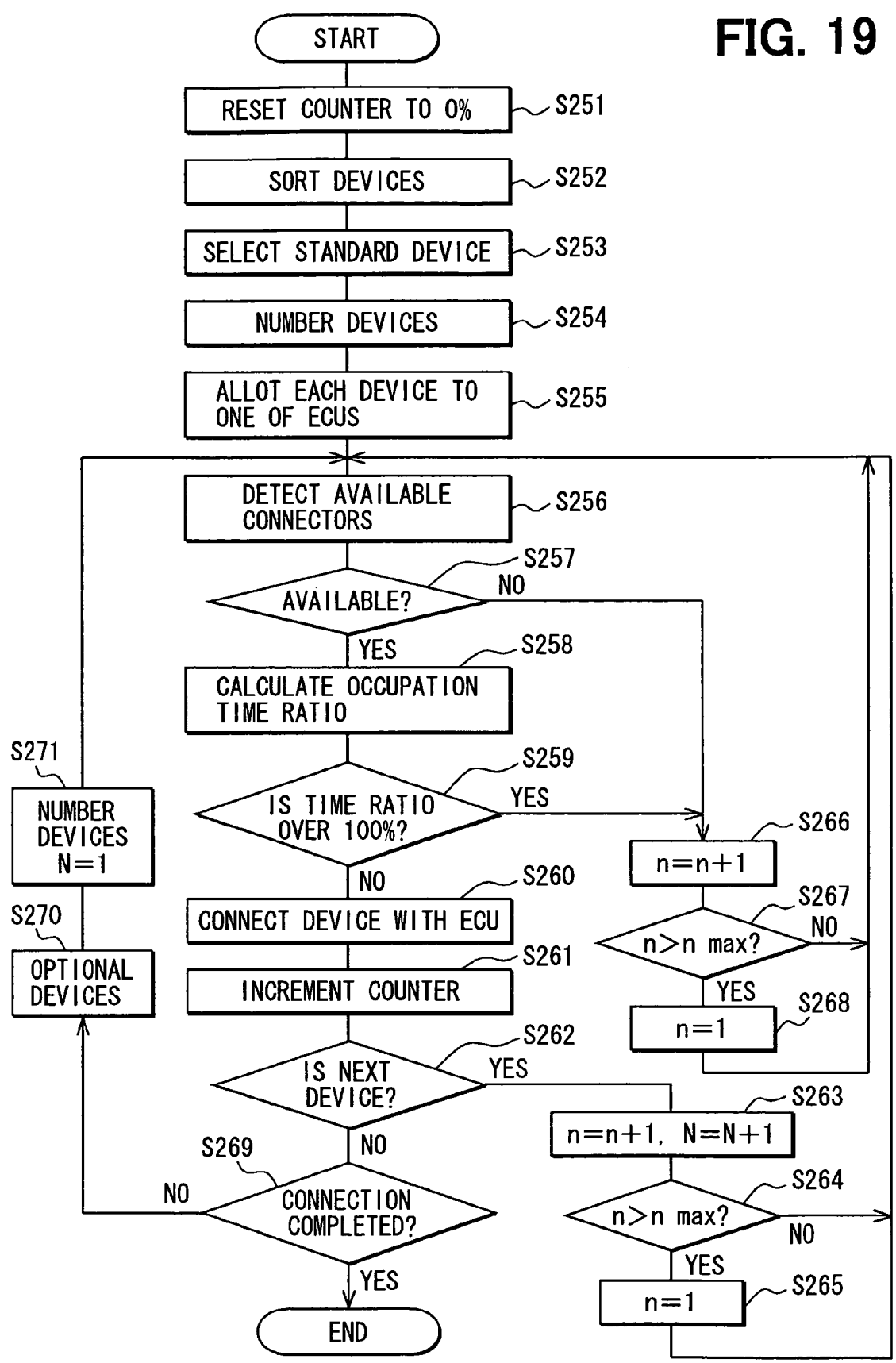
FIG. 19 is a flow diagram of the control program for controlling the changeover mechanism shown in FIG. 16.

The connection is carried out as shown by a flow diagram in FIG. 19. Firstly, a computer occupation time counter for devices to be connected with the basic control unit or ECU 50, ECU 60 and ECU 70 is reset at S251. Then, all the devices of the standard and optional equipment to be connected with the intermediate distributing unit 3 are sorted so that the devices of standard equipment can be discriminated from the devices of optional equipment at S252. Then, all the devices of standard equipment are selected at S253. Subsequently, each numbered device (e.g. device number N=1) is read in sequence of number (e.g. n=1) at S254 to allot an extra connector of one of the ECU 50, ECU 60 and ECU 70 in this order (e.g. ECU 50) at S255-S265→S256. In particular, at S258, each time one device is allotted to any of the ECU 50, ECU 60 and ECU 70, the ratio (e.g. α 1) of the occupation time of the CPU of the ECU (e.g. ECU 50) is read from a map 200 shown in FIG. 17 and counted by one of counters 201 (e.g. C1) shown in FIG. 18. Incidentally, the data stored in the map shown in FIG. 17 can be provided by conducting a test beforehand.

When all devices of standard equipment have been allotted to the ECU 50, ECU 60 and ECU 70, devices of optional equipment are to be allotted to the ECU 50, ECU 60 and ECU 70 at S262-S265→S256. At step S259 that is next to S258, whether the ratio of the occupation time of the CPU exceeds 100% or not is examined, and the step goes to S266 to change the next ECU if the result of S259 is No. The above steps are repeated until all the devices have been respectively allotted to the ECU 50, ECU 60 and ECU 70.

Incidentally, when a certain device is to be allotted to certain ECU, whether there are an extra connector and wire available for connecting the certain device with the certain ECU or not is examined at S257, and the step goes to S266 to change the next ECU if the result of S257 is No.

Thus, the occupation time of the CPU can be made equal among the ECU 50, ECU 60 and ECU 70.

In the foregoing description of the present invention, the invention has been disclosed with reference to specific embodiments thereof. It will, however, be evident that various modifications and changes may be made to the specific embodiments of the present invention without departing from the scope of the invention as set forth in the appended claims. Accordingly, the description of the present invention is to be regarded in an illustrative, rather than a restrictive, sense.

What is claimed is:

1. A flexible wiring system for an electronic system that includes inputting devices and outputting devices that are located at various areas of the vehicle, said flexible wiring system comprising:

a basic control unit having a plurality of input side connectors for respectively receiving signals of said inputting devices, an outputting-device control circuit for controlling one of said outputting devices according to at least one of said signals of said inputting devices and a first changeover circuit disposed between said input side connectors, and said outputting-device control circuit and a plurality of output side connectors;

an intermediate distributing unit, provided separately from the basic control unit, including a plurality of first side connectors respectively connected with said input side connectors of said basic control unit and output side connectors of said basic control unit, a plurality of second side connectors and a changeover mechanism disposed between a first set of said first side connectors and a first set of said second side connectors;

a plurality of wire harnesses having a plurality of electric wires, each of said wire harnesses having one end connected with one of said second side connectors and the other end connected with at least one of the inputting devices and outputting devices located at an area different from other areas where other inputting devices and outputting devices are located; and changeover control means for controlling said changeover mechanism and said change over circuit of said base control unit to change connection of said first set of first side connectors with said first set of second side connectors and connection of said first set of first side connectors with said input side connectors of said base control unit so as to switch connection of said first set of second side connectors with the outputting-device control circuit from one of said input side connectors to another according to a specific signal relating to said extra electric device to be connected by one of said wire harnesses with one of said first set of said second side connectors.

2. A flexible wiring system as claimed in claim 1, wherein said changeover control means is disposed in the basic control circuit.

3. A flexible wiring system as claimed in claim 1, wherein said intermediate distributing unit further comprises a second set of said first side connectors and a second set of said second side connectors wherein:
   said second set of said first side connectors is connected with an output side connector of the basic control circuit;
   said second set of said second side connectors is connected with an outputting device; and
   said changeover mechanism changes over connection of said second set of said first side connectors from one of said second set of said second side connectors to another.

4. A flexible wiring system as claimed in claim 1, wherein:
   said basic control unit comprises a second changeover circuit disposed between said output side connectors of said basic control circuit and said outputting-device control circuit;
   said changeover control means controls said second changeover circuit to change connection of said outputting-device control circuit from one of said output side connectors to another when controlling said changeover mechanism to change connection of said first set of said first side connectors with said first set of said second side connectors.

5. A flexible wiring system as claimed in claim 1, wherein:
   said inputting devices and outputting devices include devices of standard equipment and devices of optional equipment;
   said changeover mechanism comprises a switch matrix for connecting devices of standard equipment and devices of optional equipment; and
   said changeover control means comprises means for discriminating the devices of standard equipment and the devices of optional equipment, and means for connecting the devices of the standard equipment to an extra connector of the basic control circuit prior to the optional equipment.

6. A flexible wiring system as claimed in claim 1, wherein:
   said inputting and outputting devices include devices of standard equipment and devices of optional equipment;
   said changeover mechanism comprises a switch matrix for connecting devices of standard equipment and devices of optional equipment; and
   said changeover control means comprises means for discriminating the devices of standard equipment and the devices of optional equipment, and means for allotting each discriminated device to an extra connector of one of the basic control circuit and the optional control circuit so that the devices of standard equipment can be connected with one of the basic control system and the optional control system prior to connection of the devices of optional equipment.

7. A flexible wiring system as claimed in claim 6, wherein said means for allotting distributes the discriminated devices of standard equipment to the basic control circuit and the optional control circuit.

\* \* \* \* \*